(12) United States Patent
Bachar (10) Patent No.: US 6,487,214 B1
(45) Date of Patent: Nov. 26, 2002

(54) METHOD AND APPARATUS FOR IMPLEMENTING AN ETHERNET PROTOCOL USING THREE WIRES

(75) Inventor: Yuval Bachar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/059,523

(22) Filed: Apr. 13, 1998

(51) Int. Cl.[7] .............................................. H04L 12/413
(52) U.S. Cl. ...................... 370/445; 370/217; 370/257
(58) Field of Search .................................. 370/438, 445, 370/447, 462, 463, 217, 221, 257, 449, 451, 452; 710/107, 108, 128, 109, 110, 111, 305

(56) References Cited

U.S. PATENT DOCUMENTS

| | | | |
|---|---|---|---|
| 5,335,226 A | * | 8/1994 | Williams .................... 370/85.2 |
| 5,726,976 A | * | 3/1998 | Thompson et al. .......... 370/229 |
| 5,784,559 A | * | 7/1998 | Frazier et al. .......... 397/200.13 |
| 5,852,609 A | * | 12/1998 | Adams, III et al. .......... 370/465 |
| 6,049,528 A | * | 4/2000 | Hendel et al. ............... 370/235 |
| 6,098,103 A | * | 8/2000 | Dreyer et al. ............... 709/234 |

OTHER PUBLICATIONS

Network Systems Tutorial for IEEE Std 802.3; Repeater Functions and System Design Topology Considerations for Carrier Sense Multiple Access with collision Detection (CSMA/CD) Local Area Networks (LANs); 1995.

* cited by examiner

Primary Examiner—Ricky Ngo
Assistant Examiner—Phuc Tran
(74) Attorney, Agent, or Firm—Van Pelt & Yi LLP (57) ABSTRACT

A system and method are disclosed for transmitting signals from a digital MAC interface to a bus and for transmitting signals from a bus to a digital MAC interface. A first bus data line is modulated by holding the first bus data line at a potential when the transmit data line is in a first state and allowing the first bus data line to float when the transmit data line is in a second state when data transmission from the digital MAC interface is enabled. A second bus data line is modulated by holding the second bus data line at a potential when the transmit data line is in the second state and by allowing the second bus data line to float when the transmit data line is in the first state. One of the bus data lines are connected to a receive data line on the digital MAC interface. The state of the first data line is compared to the state of the second data line the collision line is set to a fist preselected state when the state of the first data line and the state of the second data line are both a second preselected state.

18 Claims, 7 Drawing Sheets

Prior Art

Figure 1A

Prior Art

Figure 1B

Prior Art

Start of packet

Figure 6A

Packet data          Collision detection

Figure 6B

Packet data          End of packet detection

Figure 6C

METHOD AND APPARATUS FOR IMPLEMENTING AN ETHERNET PROTOCOL USING THREE WIRES

BACKGROUND OF THE INVENTION

1. Field of the Invention

The present invention relates generally to methods and apparatuses for implementing an Ethernet physical media using a digital bus that includes three wires.

2. Description of the Related Art

The growth of local-area networks (LANs) has been driven by the introduction of Ethernet Technology as well as the availability of powerful, affordable personal computers and workstations.

Ethernet

Ethernet is a Media Access Control (MAC) layer network communications protocol specified by the Institute of Electrical and Electronics Engineers (IEEE) in IEEE specification 802.3 (the "802.3 specification"). When the Ethernet protocol is used, network devices each listen on a network bus and transmit only when no other network device is transmitting. Occasionally, two nodes do transmit nearly simultaneously and a collision occurs. A network that that includes detection of such collisions is referred to as a Carrier Sense Multiple Access Collision Detection (CSMA/CD) network.

Early Ethernet applications used a coaxial cable that carried an analog signal for the bus. Collisions were detected by analyzing the analog signal on the line to determine when two network devices were transmitting. In one implementation, collisions were detected by measuring the energy on the bus. Later, Ethernet was implemented on a set of digital communication lines that included separate transmit and receive lines. In such systems, collisions are detected by each network device by noting when data appears on the receive line while the network device is transmitting. The separate transmit and receive digital lines for each device make it necessary to have a hub to connect each of the transmit lines of the network devices to all of the receive lines of other network devices. Ethernet hubs are also referred to as repeaters. An Ethernet repeater serves as a central station for connecting network devices included in an Ethernet network, hence the term "hub." An Ethernet repeater receives messages from the transmission lines of network devices that are plugged into it and broadcasts (or "repeats") the message to all of the devices on the network on their receive lines.

As the Ethernet standard has evolved, the basic CSMA/CD scheme has remained for the most part the same. In July 1993, a group of networking companies joined to form the Fast Ethernet Alliance. The charter of the group was to draft the 802.3u 100BaseT specification ("802.3u specification") of the Institute of Electrical and Electronics Engineers (IEEE) and to accelerate market acceptance of Fast Ethernet technology. The final IEEE 802.3 specification was approved in June 1995. Among the other goals of the Fast Ethernet Alliance are: to maintain the Ethernet transmission protocol (CSMA/CD); to support popular cabling schemes; and to ensure that Fast Ethernet technology will not require changes to the upper-layer protocols and software that run on LAN workstations. For example, no changes are necessary to Simple Network Management Protocol (SNMP) management software or Management Information Bases (MIBs) in order to implement Fast Ethernet.

CSMA/CD

Carrier sense-collision detection is widely used in LANs. Many vendors use this technique with Ethernet and the IEEE 802.3 specification. A carrier sense LAN considers all stations as peers; the stations contend for the use of the channel on an equal basis. Before transmitting, the stations monitor the channel to determine if the channel is active (that is, if another station is sending data on the channel). If the channel is idle, any station with data to transmit can send its traffic onto the channel. If the channel is occupied, the stations must defer to the station using the channel.

Figure 1A:
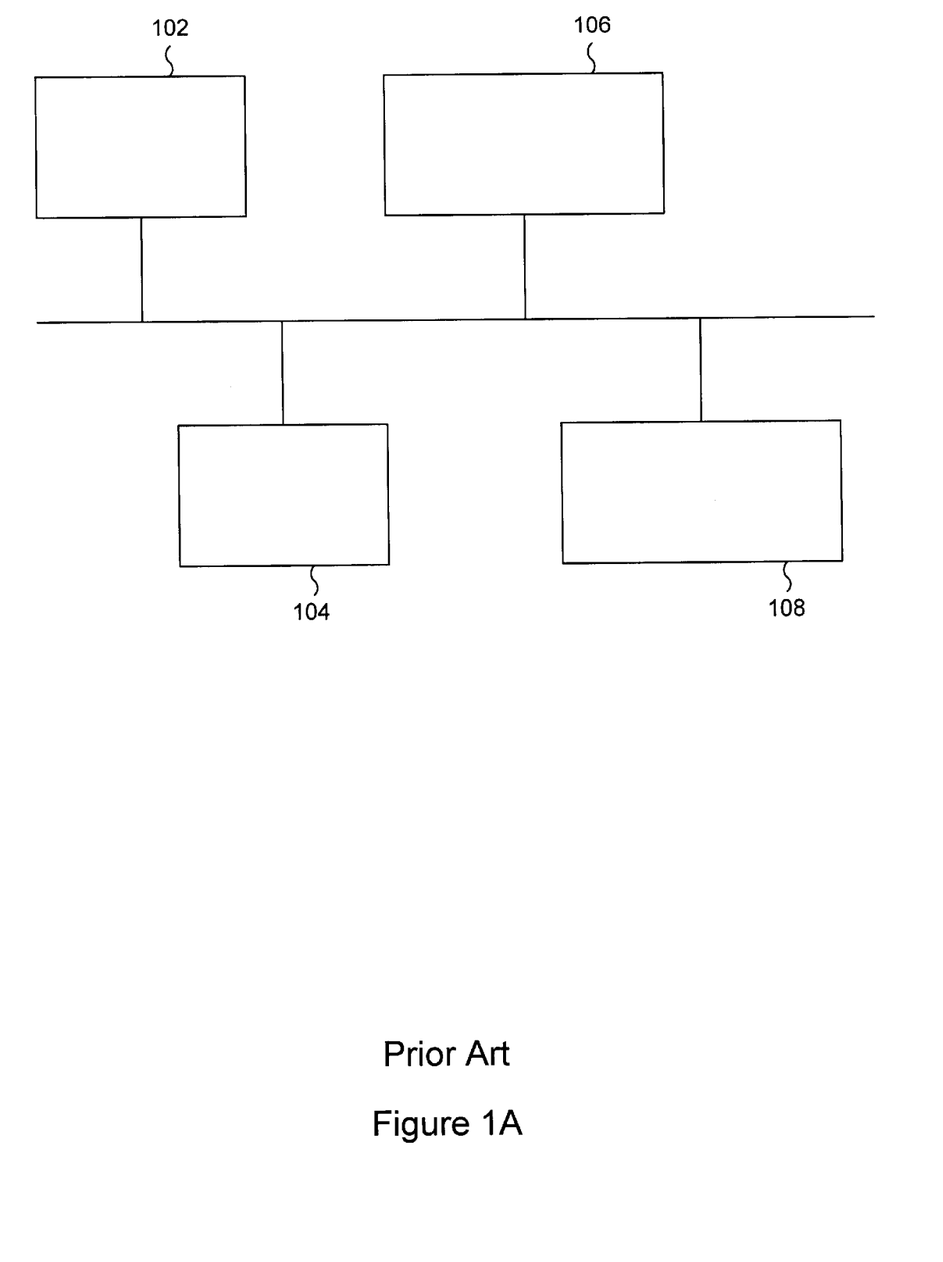
FIG. 1A depicts a carrier sense-collision detection LAN.

FIG. 1A depicts a carrier sense-collision detection LAN. Network devices 102, 104, 106, and 108 are attached to a network bus 110. Only one network device at a time is allowed to broadcast over the bus. If more than one device were to broadcast at the same time, the combination of signals on the bus would likely not be intelligible. For example, assume network devices 102 and 104 want to transmit traffic. Network device 108, however, is currently using the channel, so network devices 102 and 104 must "listen" and defer to the signal from network device 108, which is occupying the bus. When the bus goes idle, network devices 102 and 104 can then attempt to acquire the bus to broadcast their messages.

Because network device 108's transmission requires time to propagate to other network devices, the other network devices might be unaware that network device 102's signal is on the channel. In this situation, network device 102 or 104 could transmit its traffic even if network device 108 had already seized the channel after detecting that the channel was idle.

Each network device is capable of transmitting and listening to the channel simultaneously. When an analog communication line is used and two network device signals collide, they create voltage irregularities on the channel, which are sensed by the colliding network devices. The network devices then turn off their transmission and, through an individually randomized wait period, attempt to seize the channel again. Randomized waiting decreases the chances of another collision because it is unlikely that the competing network devices generate the same wait time. When digital lines are used, the network devices detect collisions by detecting data on the receive line at the same time as they are transmitting.

Figure 1B:
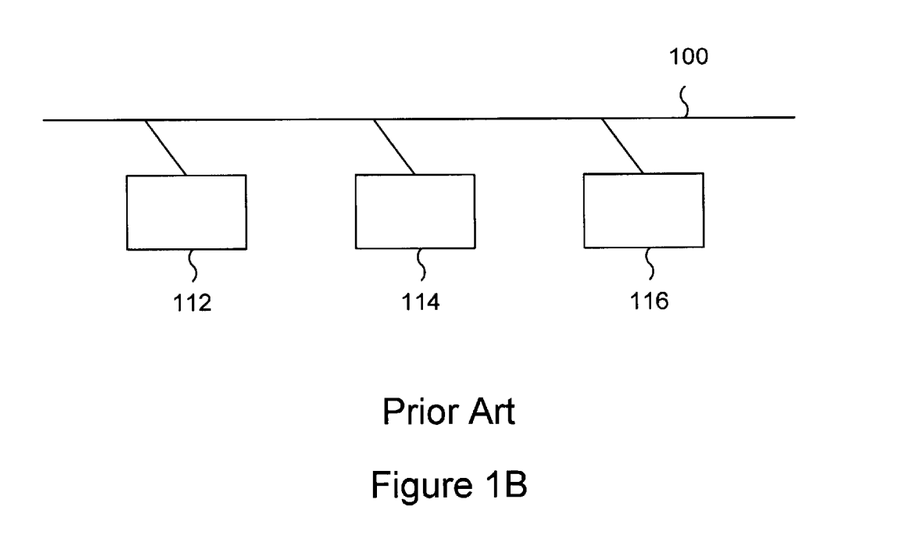
FIG. 1B is a block diagram illustrating a topology used in a conventional analog Ethernet network.

FIG. 1B is a block diagram illustrating a topology used in a conventional analog Ethernet network. An analog bus line 100 connects network devices 112, 114, and 116. Additional network devices may be added to the network by simply tapping into analog bus line 100. Since each network device transmits and receives on the same line, there is no need to include a device to connect the transmit lines of one network device to the receive lines of another network device. Each network device listens on analog bus line 100 before transmitting to make sure that no other network device is already using the bus. When two network devices simultaneously or nearly simultaneously begin transmitting, a collision occurs. The collision is sensed by the network devices by analyzing the analog signal on line 100.

Figure 1C:
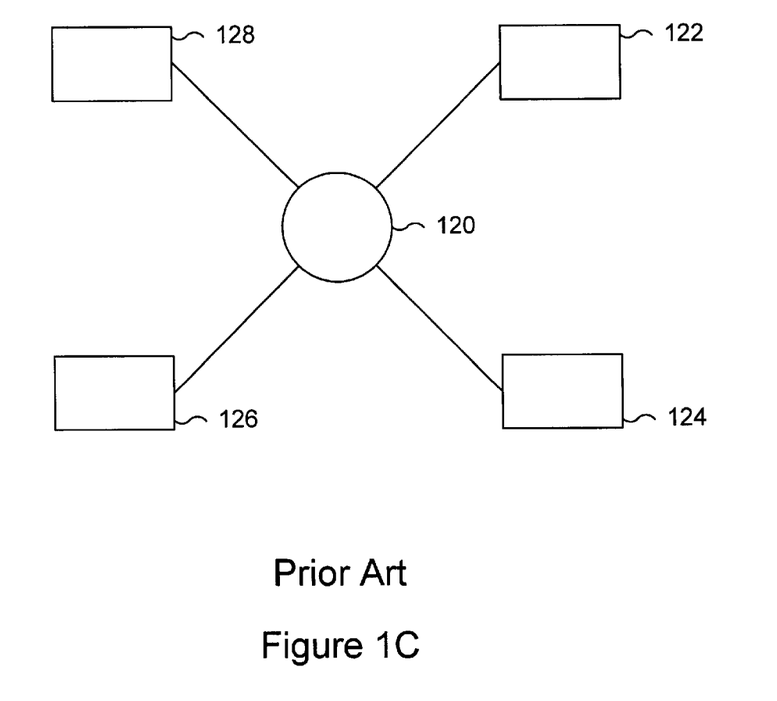
FIG. 1C is a block diagram illustrating a digital implementation of a digital Ethernet network that includes network devices.

FIG. 1C is a block diagram illustrating a digital implementation of a digital Ethernet network that includes network devices 122, 124, and 126 and 128. The digital Ethernet network does not include a common bus line as shown in FIG. 1B for the analog Ethernet network. That is because each network device includes both a transmit data line and a receive data line. Each network device therefore, must be connected to a Repeater 120. Repeater 120 receives the data transmitted on each of the data transmit lines belonging to the different network devices and repeats the transmitted data onto a each of the data receive lines of the network devices. Repeater 120 is also referred to as a hub. The interface between each network device and the repeater includes 7 wires that carry a set of signals according to the Ethernet network standard.

It would be useful if a digital Ethernet network could be implemented without requiring the use of a hub. Furthermore, it would be useful if the number of wires required to provide connections to each of the network devices in such a network could be minimized.

SUMMARY OF THE INVENTION

Accordingly, a digital Ethernet network is disclosed that allows transmission of data by multiple stations on a shared bus and does not require a hub or repeater. In one embodiment, the network uses only two wires to transmit and receive data, and a third wire for a common clock. The two data wires are logical complements of each other while data is being transmitted. Collisions are detected based on the signals transmitted on the two wires before corrupted data is transferred.

It should be appreciated that the present invention can be implemented in numerous ways, including as a process, an apparatus, a system, a device, a method, or a computer readable medium. Several inventive embodiments of the present invention are described below.

In one embodiment, a system and method are disclosed for transmitting signals from a digital MAC interface to a bus and for transmitting signals from a bus to a digital MAC interface. A first bus data line is modulated by holding the first bus data line at a potential when the transmit data line is in a first state and allowing the first bus data line to float when the transmit data line is in a second state when data transmission from the digital MAC interface is enabled. A second bus data line is modulated by holding the second bus data line at a potential when the transmit data line is in the second state and by allowing the second bus data line to float when the transmit data line is in the first state. One of the bus data lines is connected to a receive data line on the digital MAC interface. The state of the first data line is compared to the state of the second data line the collision line is set to a fist preselected state when the state of the first data line and the state of the second data line are both a second preselected state.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 2:
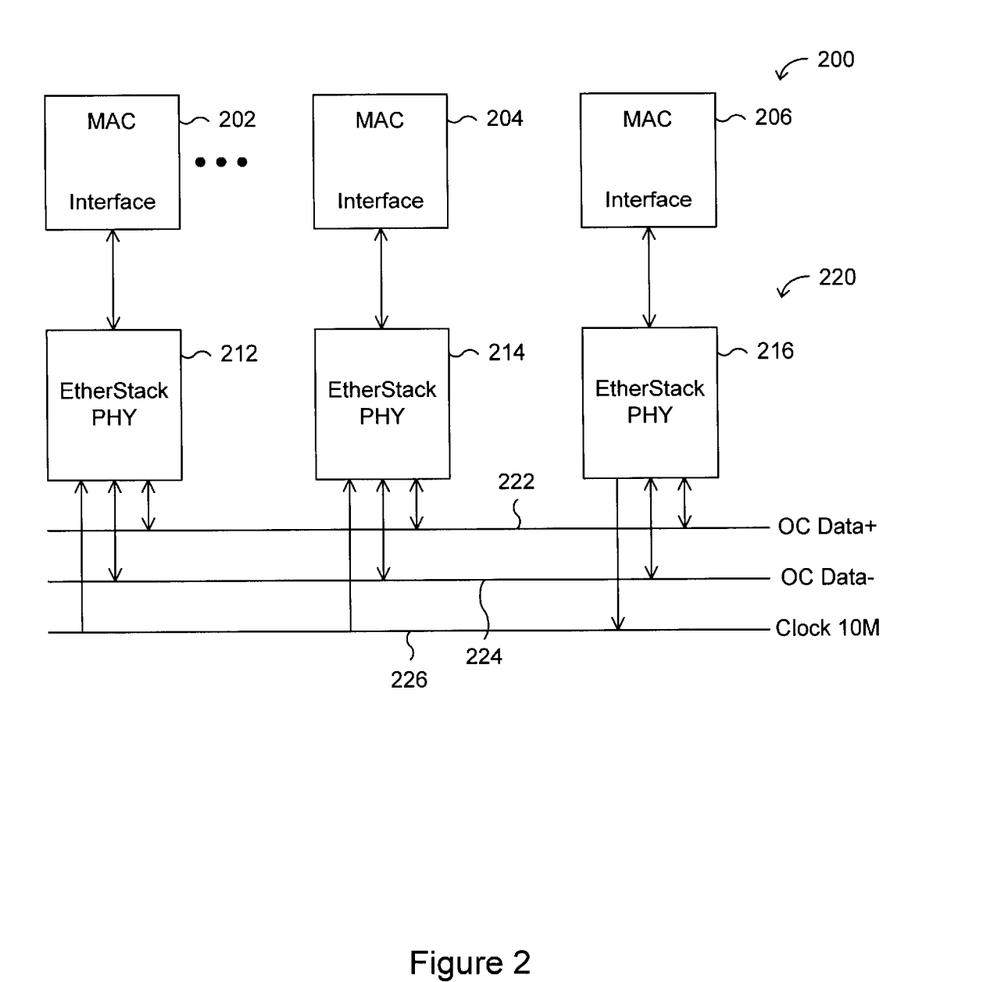
FIG. 2 is a block diagram of a digital Ethernet network that is implemented using a common bus that includes only 3 wires.

FIG. 2 is a block diagram of a digital Ethernet network that is implemented using a common bus that includes only 3 wires. A network 200 includes 3 Ethernet network devices connected together by a common bus 220. The network devices are connected to the bus using standard Ethernet MAC interfaces 202, 204, and 206. MAC interface 202 is connected to the bus via a physical layer logic unit 212. Likewise, MAC interfaces 204 and 206 are connected to the bus using physical layer logic units 214 and 216, respectively. The bus includes 3 wires. Each of the wires is suitable for carrying a digital signal. The first wire is a data line 222. Data line 222 is commonly connected to each of the physical layer logic units which both transmit data to data line 222 and receive data from data line 222. The second wire is a complimentary data line 224. Each of the physical layer logic units both transmits data to complimentary data line 224 and receives data from complimentary data line 224. As is described below, in one embodiment, complimentary data line 224 is kept at the opposite logical state from data line 222 so long as a network device is transmitting on the bus and no collision has occurred. The third line of the bus is a common clock 226.

In one embodiment, the common clock is provided by a selected one of the network devices connected to the bus. In the embodiment shown, the clock line is driven by physical layer logic unit 216. Physical layer logic units 212 and 214 receive their clock signal from clock line 226. This arrangement is preferred in one implementation of the common bus digital Ethernet network where each of the network devices are either physically stacked together or else otherwise located close together so that the delay of the clock signal over the clock line is relatively small. In one embodiment, the network is used to connect a stack of Ethernet Repeaters such as is disclosed in U.S. patent application Ser. No. 08/965460, entitled Method and Apparatus for Automatic Activation of a Clock Master on a Stackable Repeater by Moshe Voloshin, which is herein incorporated by reference for all purposes. Voloshin teaches a stackable Ethernet repeater. Voloshin also teaches a way to determine the position of each repeater in a stack. In one embodiment of the present invention, the method disclosed in Voloshin is used to determine which network device is the device which provides the clock signal. In different embodiments, other methods of determining which network device provides the clock are used including user selection during configuration.

It should also be noted that, in other embodiments, other clock arrangements are used between the network devices, including an asynchronous clock or a common clock provided by some other source. A common clock signal provided by one of the network devices selected according a specified scheme is preferred when the network extends over a relatively small area because it requires only one wire on the bus to carry the clock signal.

Figure 3:
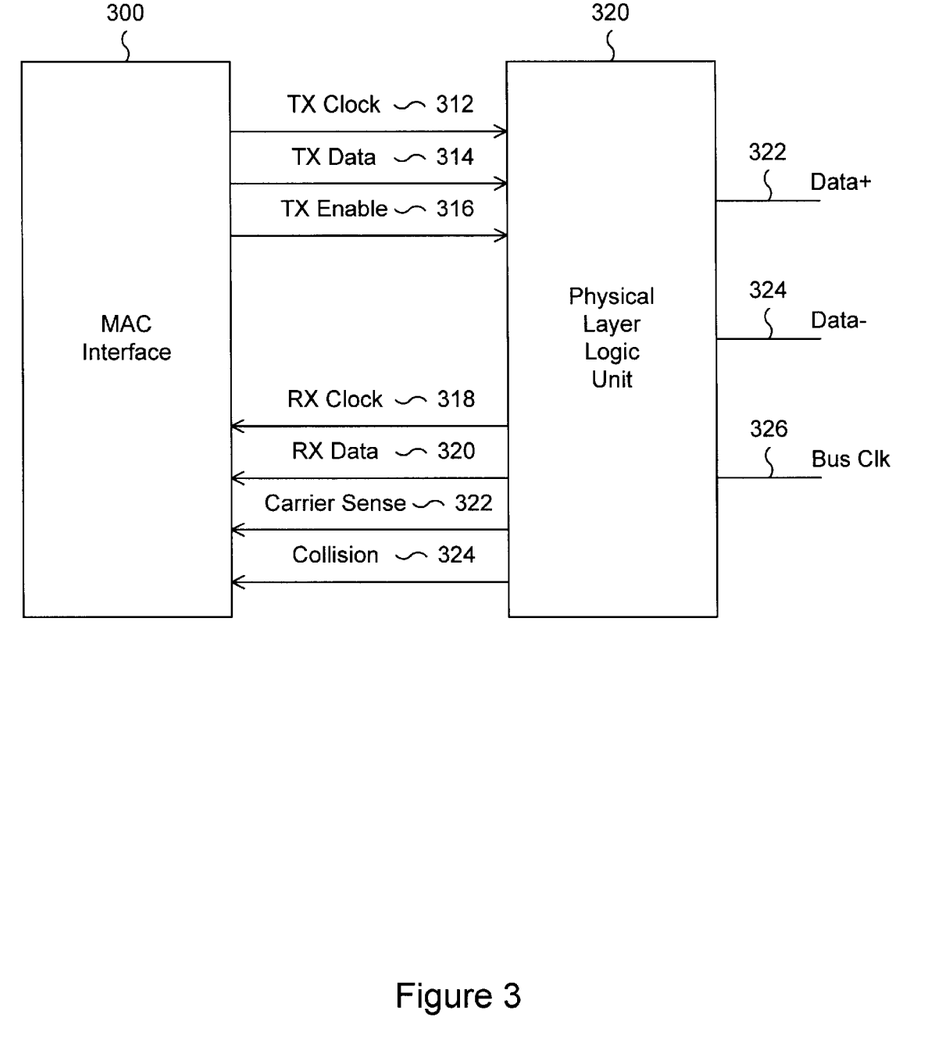
FIG. 3 is a block diagram illustrating the connections made between a MAC interface and a physical layer logic unit.

FIG. 3 is a block diagram illustrating the connections made between a MAC interface 300 and a physical layer logic unit 320. The interface between the MAC interface and the physical layer logic unit includes the same seven standard wires used in a standard Ethernet digital network. These include a transmit clock line 312, a transmit data line 314, a transmit enable line 316, a receive clock line 318, a receive data line 320, a carrier sense line 322, and a collision line 324. The transmit clock and receive clock lines provide clock signals for transmitting and receiving data, respectively. The transmit data line carries transmitted data. The transmit enable line carries a signal which indicates that data is being transmitted on the transmit data line. Likewise, the receive data line carries data that is being sent to the MAC Interface and the carrier sense line, which is sometimes referred to as a receive data enable line, carries a signal which indicates that data is being transmitted to the MAC Interface on the receive data line. The collision line indicates that a collision has occurred, presumably because more than one network device is simultaneously attempting to transmit on the network.

Physical layer logic unit 320 receives the standard signals generated by the transmit clock line, transmit data line, and the transmit enable line. Physical logic unit also generates the signals sent to the MAC Interface on the receive clock line, the receive data line, the carrier sense line, and the collision line. Thus, the MAC Interface is a standard 7 wire Ethernet interface and no change need be made to the standard Ethernet Mac Interface for the common bus digital Ethernet network to be implemented. The physical layer logic unit generates all of the standard signals expected by the MAC interface and receives the standard signals from the MAC Interface and adapts them for transmission across the common bus. As shown in FIG. 3, the common bus includes a data line 330, a complementary data line 324, and a common clock line 326. The generation of the signals for those lines is described in detail in FIG. 4.

Figure 4:
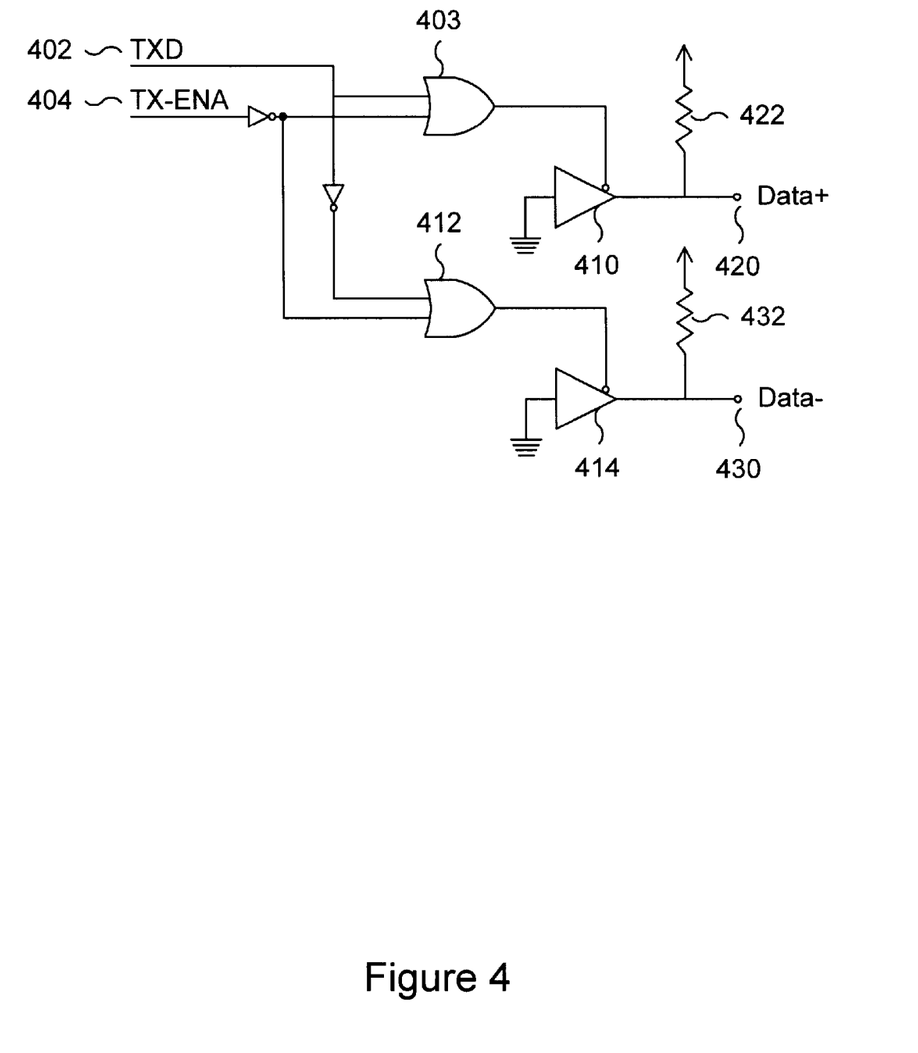
FIG. 4 is a schematic diagram illustrating how the signals for the data line and the complimentary data line are generated from a transmit data line connected to a MAC interface.

FIG. 4 is a schematic diagram illustrating how the signals for the data line and the complementary data line are generated from a transmit data line connected to a MAC interface. A transmit data line 402 is input into an OR gate 403. A transmit enable line 404 is inverted and then also input into OR gate 403. According to the Ethernet standard, transmit enable line 404 is high whenever data is being transmitted on transmit data line 402. It should be noted that in other embodiments of the present invention, other data may be input and suitably converted into the data line and complementary data line signals using other logic adapted to whatever convention is being used. For example, if a low signal on the transmit enable line were to indicate the data is being transmitted, then the transmit enable line would not be inverted before being input into OR gate 403.

It should also be noted that it is generally preferred to buffer the transmit data signal and the transmit enable signal from the MAC interface before inputting the signals into the signal conversion network shown here. Buffering digital signals is well know to those of skill in the art and no buffer is shown here for the purpose of clarity so that the invention is not unnecessarily obscured in detail. The output of OR gate 403 is inverted and connected to the enable pin of a tri-state buffer 410. The input to tri-state buffer 410 is shown grounded. Thus, when the output of OR gate 403 is low, tri-state buffer 410 is enabled and the output of tri-state buffer 410 at data output 420 is grounded. When the output of OR gate 403 is high, tri-state buffer 410 is not enabled and data output 420 is allowed to float. Data output 420 is then weakly pulled high by a pull up resister 422. Thus, data output 420 is in the same logical state as data line 402 so long as transmit enable line 404 is high. Data output 420 is always high when transmit enable line 404 is low.

Similarly, the signal on transmit data line 402 is inverted and input to an OR gate 412 along with the inverted signal from transmit enable line 404. When transmission is enable and transmit enable line 404 is high, the output of OR gate 412 is the compliment of the data input on transmit data line 402. The output of OR gate 412 is inverted and connected to the enable line of a tri-state buffer 414. As a result, the output of tri-state buffer 414 at complimentary data output 430 floats when transmission is enabled and transmit data line 402 is low. Complimentary data output 430 is then pulled high by a weak pull up resister 432. Complimentary data output 430 is grounded when transmission is enabled and transmit data line 402 is high. Complimentary data output 430 is also pulled high by a weak pull up resister 426. Complimentary data output 430 is always high when transmit enable line 404 is low.

It should be noted that in other embodiments, devices other than tri-state buffer are used. Generally, the purpose of the tri-state buffer is to allow the outputs of all of the physical layer logic units connected to the data line and the complimentary data line to be OR'ed together. Any type of open collector or open drain circuit could alternatively be used for this purpose. In one preferred embodiment, the circuit shown in FIG. 4 is implemented on a field programmable gate array (FPGA).

It should again be noted that in the previous description different lines have described as being high or low. For example, when the transmit enable line is high, then data is put on the transmit data line. Of course, a person of ordinary skill in the art would recognize that equivalently the transmit enable line could enable the transmission of data on the transmit data line when the transmit enable line is low. It should be recognized in the following description and in the following claims, therefore, that whenever a line is described as enabling a certain function or indicating a certain state when it is high, the line could also equivalently enable the same function or indicate the same state by being low. It is explicitly stated herein that the claims are intended to cover both cases. The transmit enable line could either enable transmission when it is high and disable transmission when it is low or equivalently, it could enable transmission when it is low and disable transmission when it is high.

The result of the data line driving circuit shown in FIG. 4 is that data line 420 and complimentary data line 430 are each selectively allowed to float high or else are grounded according to the data on transmit data line 402 whenever transmission is enabled by transmit enable line 404. Whenever data line 420 is allowed to float high, complimentary data line 430 is grounded and whenever data line 420 is grounded, complimentary data line 430 is allowed to float high so long as data is being transmitted. When data is not being transmitted, and transmit enable line 404 is low, both data output line 430 and complimentary data output line 420 float high. Thus, when a number of network devices are connected to data output line 420 and complimentary data output line 430, both lines float high so long as no network device is transmitting.

Once a network device begins transmitting, either data output line 420 or complimentary data output line 430 is pulled low at any given time during transmission according to the data being transmitted. Thus, data output line 420 and complimentary data output line 430 are in complementary logical states. If a second network device attempts to transmit data at the same time, that network device will also selectively pull down data line 420 or complimentary data line 430, trying to keep the two lines in opposite logical states. As soon as the data transmitted by the two network devices differs, both data line 420 and complimentary data line 430 will be pulled to ground. The detection of this event, that is, data line 420 and complimentary data line 430 being both grounded, is used to determine that a collision has occurred. The detection of a collision by this method is further illustrated in FIG. 6.

Figure 5:
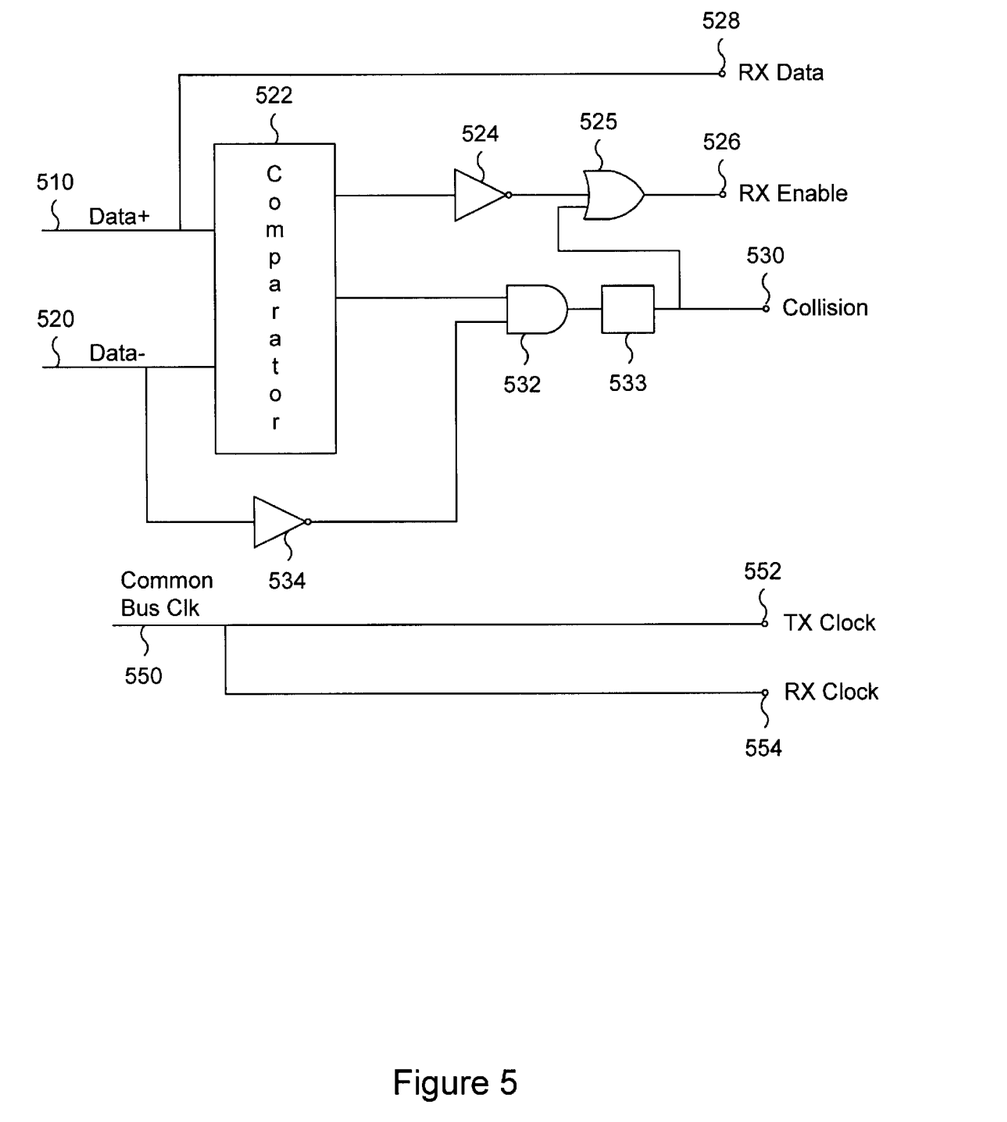
FIG. 5 is a schematic diagram illustrating how the receive data, receive enable, collision, transmit clock, and receive clock signals are derived from the three wires included in the digital data bus.

FIG. 5 is a schematic diagram illustrating how the receive data, receive enable, collision, transmit clock, and receive clock signals are derived from the three wires included in the digital data bus. Data line 510 and complimentary data line 520 are both input into a comparator 522. The output of comparator 522 is inverted by an inverter 524. The output of inverter 524 is preferably masked using OR gate 525 and the latched collision signal output to enable correct identification of collisions by the MAC. When the logic state of data line 510 is different from the logic state of data line 520, then the output of the comparator is zero and the inverted output of the comparator at 526 is one. Thus, so long as either the data line or the complimentary data line is grounded while the other line is allowed to float, the receive enable line is high, indicating that data is being transmitted.

In the embodiment shown, the receive data output 528 is derived directly from data line 510. In certain embodiments, a buffer may be included between data line 510 and receive data line 528. It should also be noted that receive data line 528 could alternatively be connected to the output of an inverter that is connected to complimentary data line 520. A collision output 530 is derived from the output of comparator 522 and the inverted complimentary data line signal being input into an AND gate 532. In one embodiment, latch 533 keeps collision output 530 high until the bus becomes idle again. Inverter 534 inverts the complimentary data line signal so that the output of AND gate 532 is high only when the signal on data line 510 and the signal on complimentary data line 520 are the same and the signal on complimentary data line 520 is low. Alternatively, data line 510 could be inverted and input into AND gate 532 instead of inverted complimentary data line 520.

The common bus clock line 550 is connected to both a transmit clock line 552 and a receive clock line 554. It should be noted that other clock arrangements could be made and that the data line/complimentary data line arrangement shown at the top of FIG. 5 may be implemented independently of whatever clock scheme is used.

The result of the circuit shown in FIG. 5 is that the received data line carries data from data line 510, the receive enable line is high so long as the output of data line 510 and complimentary data line 520 are not both high, and collision line 530 is high only when data line 510 and complimentary data line 520 are both low. Thus, both the receive data signals and the collision signal are generated for output to the MAC interface. As shown in FIG. 4, the transmit data and transmit enable lines from the MAC interface of each of the network devices are used to generate the data and complimentary data lines. Thus, the four data and data enable lines of the standard Ethernet MAC interface are selectively used both to generate signals on the data line and the complimentary data line and to receive the signals from the data line and the complimentary data line via the physical layer logic unit. Additionally, the physical layer logic unit generates the collision signal based on the states of the data line and the complimentary data line. The final two lines of the standard seven wire Ethernet interface, the transmit clock and the receive clock, are both connected to the common bus clock line in one embodiment. Thus, the five data and collision wires of the standard seven wire Ethernet interface are connected to the data line and the complimentary data line. The transmit clock and the receive clock are commonly connected to the common bus clock.

Figure 6A:
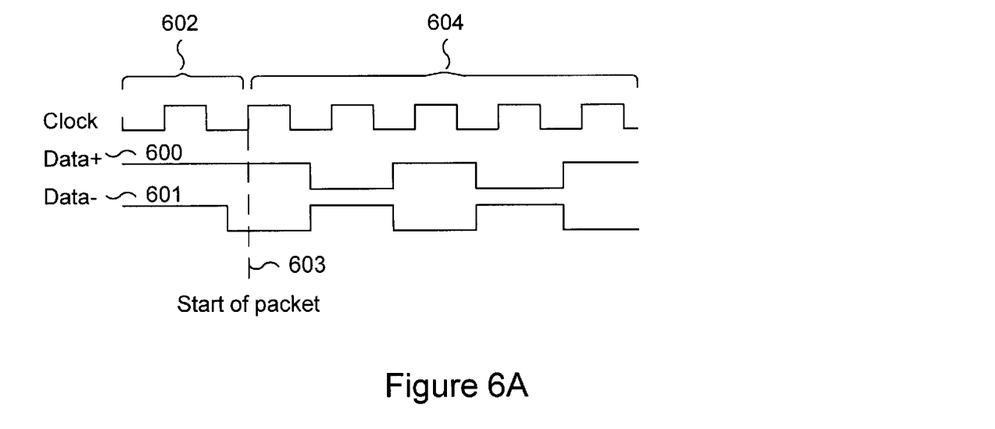
FIGS. 6a–6c illustrate how data transmission is detected based on the signals on the data line and the complimentary data line and how collisions and the end of data transmission are detected as well.
Figure 6B:
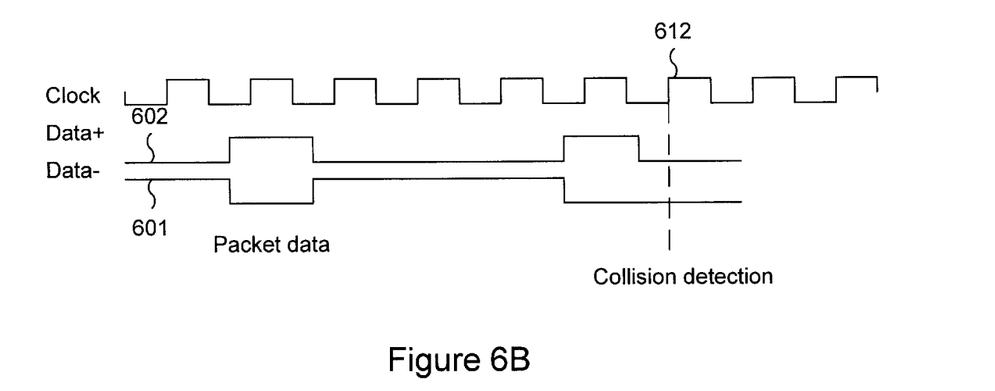
Figure 6C:
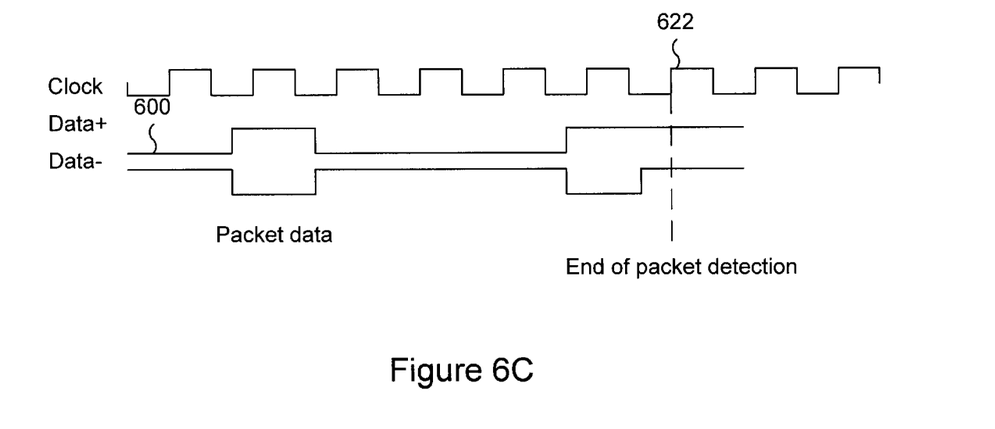

FIGS. 6a–6c illustrate how data transmission is detected based on the signals on the data line and the complimentary data line and how collisions and the end of data transmission are detected as well. Referring first to FIG. 6A, during period 602, data line 600 and complimentary data line 601 are both high. This indicates that no network device is transmitting data and therefore no network device is selectively grounding one of the data lines. Upon the clock transition at point 603, complimentary data 601 is low and data line 600 is high. This marks the beginning of a data transmission and the start of a data packet. Data continues to be transmitted during a period 604. Referring next to FIG. 6B, data is being transmitted so long as data line 600 and data line 601 are in opposite logical states. A collision occurs at point 612 when data line 600 and complimentary data line 601 are both low. Referring next to FIG. 6C, data transmission terminates at point 622 when data line 600 and complimentary data line 601 are both high at point 622. Thus, the transmission of data is detected when one of the data lines is in a low data state and a collision is detected when both data lines are in the low state.

A common bus digital Ethernet architecture has been disclosed that enables digital signals to be sent along Ethernet without the need for a repeater. Only two wires are required to carry data and provide data enable signals as well as collision detection. A third wire is used to carry a common clock for both transmitting and receiving at each network device. Collisions are detected as soon as two devices attempt to transmit different data on the common data lines. Examples of the distances between the network devices include less than 10 meters and less than meters.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. An Ethernet network substantially conforming to IEEE standard 802.3 comprising:

a plurality of network devices wherein each of the network devices includes an Ethernet MAC interface that is connected to a physical layer logic unit; and a bus that connects the physical layer logic units to each other wherein the bus consists essentially of a first bus data line, a complementary second bus data line, and a bus clock line;

wherein each of the respective physical layer logic units is configured to:

set the first bus data line to a first logic level while at the same time setting the second bus data line to a second logic level to transmit a first binary data value; and set the first bus data line to the second logic level while at the same time setting the second bus data line to the first logic level to transmit a second binary data value.

2. An Ethernet network as recited in claim 1 wherein the Ethernet MAC interface includes a transmit data line and a transmit enable data line and wherein the physical layer logic unit modulates the first bus data line and the complementary second bus data line when the transmit enable data line is in a high state according to the data on the transmit data line.

3. An Ethernet network as recited in claim 1 wherein the Ethernet MAC interface includes a receive data line, a receive enable line, and a collision line and wherein the physical layer logic unit modulates the receive data line according to the state of one of the bus data lines and wherein the receive enable line is in a high state when the first bus data line and the complementary second bus data line are not both in the first logical state and wherein the collision line is in a high state when the first bus data line and the complementary second bus data line are both in the second logical state.

4. An Ethernet network as recited in claim 2 wherein the physical layer logic unit modulates the first bus data line and the complementary second bus data line by either grounding the line or allowing the line to float.

5. An Ethernet network as recited in claim 2 wherein the physical layer logic unit modulates the first bus data line and the complementary second bus data line by either driving the line high or allowing the line to float.

6. An Ethernet network as recited in claim 1 wherein the plurality of network devices are separated from each other by a distance of less than 10 meters.

7. An Ethernet network as recited in claim 1 wherein the plurality of network devices are stacked and are separated from each other by a distance of less than 2 meters.

8. An Ethernet network as recited in claim 1 wherein the wherein the plurality of network devices are stacked and are separated from each other by a distance of less than 2 meters.

9. An Ethernet network as recited in claim 1 wherein the Ethernet MAC interface includes a transmit clock line and a receive clock line and wherein the physical layer logic unit connects both the transmit clock line and the receive clock line to a bus clock line.

10. A method of transmitting signals from a digital MAC interface having a transmit data line to a bus having a first bus data line and a second bus data line comprising:

modulating the first bus data line by holding the first bus data line at a pre-selected potential when the transmit data line is in a first state and allowing the first bus data line to float when the transmit data line is in a second state during an interval when data transmission from the digital MAC interface is enabled; and modulating the second bus data line by holding the second bus data line at the pre-selected potential when the transmit data line is in the second state and by allowing the second bus data line to float when the transmit data line is in the first state;

whereby the first bus data line is set to a first logic level while at the same time the second bus data line to is set to a second logic level to transmit a first binary data value, and the first bus data line is set to the second logic level while at the same time the second bus data line is set to the first logic level to transmit a second binary data value.

11. A method as recited in claim 10 wherein the digital MAC interface substantially conforms to IEEE standard 802.3.

12. A method as recited in claim 10 further including:

connecting a bus clock line on the bus to a transmit clock line on the MAC interface; and connecting the bus clock line on the bus to a receive clock line on the MAC interface.

13. A method of transmitting signals from a bus having a first bus data line and a second bus data line to a digital MAC interface having a receive data line and a collision line, comprising:

coupling the first bus data line to a first potential associated with a first logic level while at the same time weakly pulling the second bus data line to a second potential associated with a second logic level, to transmit a first binary data value;

coupling the second bus data line to the first potential associated with the first logic level while at the same time weakly pulling the first bus data line to the second potential associated with the second logic level, to transmit a second binary data value;

connecting the first bus data line to the receive data line; and comparing the state of the first bus data line to the state of the second bus data line and setting the collision line to a pre-selected state associated with a collision being detected if the first bus data line and the second bus data line are both at the first logic level.

14. A method as recited in claim 13 wherein the first logic level and the pre-selected state are both logic high states.

15. A method as recited in claim 13 wherein the first logic level and the pre-selected state are both logic low states.

16. A method as recited in claim 13 wherein the digital MAC interface substantially conforms to IEEE standard 802.3.

17. A method as recited in claim 13 further including:

connecting a bus clock line on the bus to a transmit clock line on the MAC interface; and connecting the bus clock line on the bus to a receive clock line on the MAC interface.

18. A method as recited in claim 13 further including:

setting a receive enable line to a fist pre-selected state when the state of the first bus data line is a different state than the state of the second bus data line.

* * * * *